US006862169B2

(12) United States Patent
Kuroyanagi (10) Patent No.: US 6,862,169 B2
(45) Date of Patent: Mar. 1, 2005

(54) SOLID ELECTROLYTIC CAPACITOR AND METHOD FOR PRODUCING THE SAME

(75) Inventor: Masahiro Kuroyanagi, Nagano (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 28 days.

(21) Appl. No.: 10/360,611

(22) Filed: Feb. 10, 2003

(65) Prior Publication Data

US 2003/0156364 A1 Aug. 21, 2003

Related U.S. Application Data

(60) Provisional application No. 60/361,279, filed on Mar. 4, 2002.

(30) Foreign Application Priority Data

Feb. 21, 2002 (JP) ..................... P2002-045248

(51) Int. Cl.[7] ................................. H01G 9/00
(52) U.S. Cl. ................. 361/523; 361/532; 361/541; 29/25.03
(58) Field of Search ............... 361/523, 528, 361/529, 530, 532, 541, 522; 29/25.03

(56) References Cited

U.S. PATENT DOCUMENTS 4,910,645 A    3/1990  Jonas et al.
5,122,931 A *  6/1992  Shimada et al. ............ 361/523
6,229,689 B1   5/2001  Kobayashi et al.

FOREIGN PATENT DOCUMENTS

| JP | 2-15611    |   | 1/1990 |
|----|------------|---|--------|
| JP | 4-119624   |   | 4/1992 |
| JP | 8-3156     |   | 1/1996 |
| JP | 10-32145   |   | 2/1998 |
| JP | 126958 A   | * | 5/2001 |

\* cited by examiner

Primary Examiner—Anthony Dinkins
(74) Attorney, Agent, or Firm—Sughrue Mion, PLLC (57) ABSTRACT

A solid electrolytic capacitor having a plurality of solid electrolytic capacitor elements each having an anode part assigned to one end part of an anode substrate composed of a valve-acting metal having on the surface thereof a dielectric film layer, and a cathode part consisting of a solid electrolyte layer formed on the dielectric film layer in the remaining portion of the anode substrate and an electrically conducting layer formed on the solid electrolyte layer. The anode parts are stacked on one another and the cathode parts are stacked on one another, and the stacked anode parts and stacked cathode parts are connected to a lead frame and are molded with an outer jacket resin. Each solid electrolytic capacitor element has a notched part at least at one part of the cathode part and an electrically conductive material fills the notched part.

14 Claims, 4 Drawing Sheets

SOLID ELECTROLYTIC CAPACITOR AND METHOD FOR PRODUCING THE SAME

CROSS-REFERENCE TO RELATED APPLICATIONS

This application claims benefit of Provisional Application 60/361,279 filed Mar. 4, 2002, incorporated herein by reference, under 35 U.S.C. § 111(b) pursuant to 35 U.S.C. § 119(e) (1).

BACKGROUND OF THE INVENTION

1. Field of the Invention

The present invention relates to a solid electrolytic capacitor and a method for producing the same. More specifically, the present invention relates to a solid electrolytic capacitor obtained by stacking valve-acting metal substrates each having a dielectric film, which has remarkably reduced equivalent series resistance (ESR), and also relates to a production method therefor.

2. Description of the Related Art

With recent progress of small-size and high-frequency electronic equipment, there is a demand for a small size solid electrolytic capacitor as one of constituent electronic parts therefor. This requirement for downsizing is generally met by a chip-form stacked capacitor.

Figure 1:
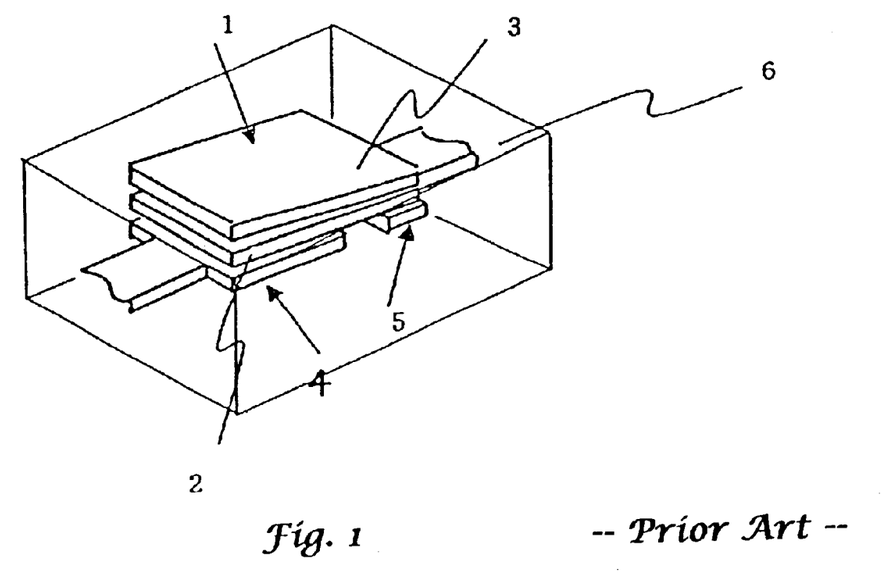
FIG. 1 is a perspective view showing a conventional stacked solid electrolytic capacitor.

FIG. 1 is a perspective view showing a conventional chip-form solid electrolytic capacitor. A plurality of solid electrolytic capacitor elements 1 are disposed to lie in the same direction inside an outer jacket resin 6. The anode part 3 of the capacitor element 1 and the bottom surface of the cathode part 2 formed on the surface of the element are placed on an anode lead part 5 (as an anode lead pulling out part of a lead frame) and on a cathode lead part 4 (as a cathode lead pulling out part), respectively. Also, each is bonded to the part with an electrically conducting material such as an electrically conductive adhesive. The anode lead part and the cathode lead part are paired and disposed to face each other. The thus-fabricated device is molded with a separately prepared outer jacket resin 6 such as epoxy resin.

For example, in the case where the capacitor element in a solid electrolytic capacitor has a tabular shape, a dielectric film is provided on the surface of an electrode material composed of a tabular metal having valve action, a solid electrolyte layer is provided on the dielectric film, an electrically conducting cathode layer is provided on the solid electrolyte layer to form a cathode part of the capacitor element, an anode part is integrally provided on the electrode material of the capacitor element, a resist film for masking is applied to provide a portion which becomes the anode lead pulling out part, a plurality of capacitor elements are stacked one on another such that the connection part of electrically conducting cathode layers and the connection part of the anode parts come to respective corresponding positions, and the stacked body is connected to a cathode lead part and an anode lead part. By employing such a structure, the volume efficiency (capacitance value of capacitor with a fixed volume) of the capacitance of a capacitor is elevated.

The equivalent series resistance of a solid electrolytic capacitor is governed mainly by the intrinsic resistance component of the anode lead part, the contact resistance component on the joined face of the anode lead part and the anode part of the capacitor element, the intrinsic resistance component of the capacitor element, the contact resistance component on the joined face of the cathode part of the capacitor element and the cathode lead part, and the intrinsic resistance component of the cathode lead part.

In a solid electrolytic capacitor having a stacked structure, the first layer capacitor element and the cathode lead part are electrically connected with an electrically conducting material (e.g., electrically conducting adhesive). The second layer capacitor element is bonded to the first layer capacitor element using an electrically conducting material (e.g., electrically conducting adhesive) and therefore, electrically connected to the cathode lead part through the electrically conducting cathode layer formed on the surface of the first layer capacitor element. The resistance component of this electrically conducting cathode layer gives rise to a problem of increasing the equivalent series resistance of the solid electrolytic capacitor.

If the electrically conducting adhesive or the like is coated after stacking the capacitor elements to electrically connect each of stacked capacitor elements directly to the cathode lead part, the equivalent series resistance of the solid electrolytic capacitor decreases However, a step of coating the electrically conducting adhesive over respective capacitor elements is necessary and this causes a problem in productivity and profitability.

The equivalent series resistance of a solid electrolytic capacitor can also be decreased by directly joining a cathode lead part to respective capacitor elements, however, a problem is similarly present in that a complicated step of processing the cathode lead part is also necessary. For reducing the equivalent series resistance of a capacitor device, a method of boring a hole in the capacitor device has been proposed (see, JP-A-4-119624 (the term "JP-A" as used herein means an "unexamined published Japanese patent application")), however, the equivalent series resistance between stacked capacitor elements cannot be decreased by this method.

SUMMARY OF THE INVENTION

The present inventors have made extensive investigations to solve the above-described problems. As a result, in the present invention, the shape of the cathode part of a capacitor element is merely changed without greatly changing the conventional production method of a solid electrolytic capacitor, whereby the stacked capacitor elements all can be directly connected to the cathode lead part using an electrically conducting adhesive.

At the time of producing an anodic oxide film on the surface of an electrode material composed of a tabular metal having a valve action, a cathode notched part is previously provided at least at one part in the portion which becomes the cathode part of a capacitor element. Thereafter, a solid electrolyte layer is provided, an electrically conducting cathode layer is provided on the solid electrolyte layer to prepare a capacitor element, an anode terminal is integrally provided on the electrode material of this capacitor element, a portion applied with an insulating resin band (masking) is provided in the anode terminal, a plurality of capacitor elements are stacked one on another such that the electrically conducting cathode layer and the anode terminal part come to respective corresponding positions, and the stacked body is connected to a cathode lead part and an anode lead part, whereby a solid electrolytic capacitor having an excellent equivalent series resistance component can be obtained.

More specifically, the present invention provides the following solid electrolytic capacitor and a method for producing the same:

1) a solid electrolytic capacitor comprising a stacked body of a plurality of solid electrolytic capacitor elements each having an anode part assigned to one end part of an anode substrate composed of a valve-acting metal having on the surface thereof a dielectric film layer, and a cathode part consisting of a solid electrolyte layer formed on the dielectric film layer in the remaining portion of the anode substrate and an electrically conducting layer formed thereon, the stacked anode parts and the stacked cathode parts stacked being connected to a lead frame and the stacked body being molded with an outer jacket resin, wherein each solid electrolytic capacitor element has a notched part at least at one part of the cathode part and an electrically conductive material is filled in the notched part;

2) the solid electrolytic capacitor as described in 1 above, wherein the notched part in the cathode part of the solid electrolytic capacitor element is present at the edge part of the cathode part;

3) the solid electrolytic capacitor as described in 1 or 2 above, wherein the solid electrolytic capacitor element has an insulating resin band circumferentially formed at the boundary of the anode part and the cathode part;

4) the solid electrolytic capacitor as described in any one of 1 to 3 above, wherein the notched parts in the stacked cathode parts are covered with an electrically conducting material;

5) the solid electrolytic capacitor as described in any one of 1 to 4 above, wherein the valve-acting metal is selected from the group consisting of aluminum, tantalum, titanium, niobium and an alloy thereof;

6) the solid electrolytic capacitor as described in any one of 1 to 4 above, wherein the valve-acting metal is an electrochemically formed aluminum foil or an electrically formed niobium foil;

7) the solid electrolytic capacitor as described in any one of 1 to 6 above, wherein the valve-acting metal is an electrochemically formed foil obtained by electrochemical forming at a voltage of less than 30 V;

8) the solid electrolytic capacitor as described in any one of 1 to 7 above, wherein the lead frame is a copper- or copper alloy-based material;

9) the solid electrolytic capacitor as described in any one of 1 to 8 above, wherein the solid electrolyte contains a π-electron conjugated system polymer;

10) the solid electrolytic capacitor as described in 9 above, wherein the π-electron conjugated system polymer is a polymer obtained from a 5-membered heterocyclic compound;

11) the solid electrolytic capacitor as described in 10 above, wherein the 5-membered heterocyclic compound is selected from the group consisting of pyrrole, thiophene, furan, isothianaphthene, 1,3-dihydroisothianaphthene and substitution derivatives thereof;

12) the solid electrolytic capacitor as described in 10 above, wherein the 5-membered heterocyclic compound is selected from the group consisting of 3,4-ethylenedioxythiophene and 1,3-dihydroisothianaphthene;

13) a method for producing a solid electrolytic capacitor, which comprises providing an anode part at one end part of an anode substrate composed of a valve-acting metal having on the surface thereof a dielectric film layer, forming a solid electrolyte layer on the dielectric film layer of the valve-acting metal having a notched part at least at one part in the remaining portion of the anode substrate, forming an electrically conducting layer thereon to prepare a solid electrolytic capacitor element having a cathode part, stacking a plurality of the elements to superpose the notched parts one on another, filling an electrically conducting material in the notched parts, connecting the cathode parts and the anode parts to a lead frame, and molding the stacked body with an outer jacket resin; and 14) the method for producing a solid electrolytic capacitor as described in 13 above, wherein a plurality of the solid electrolytic capacitor elements each having an insulating resin band circumferentially provided at the boundary of the anode part and the cathode part are stacked to superpose the notched parts one on another, an electrically conducting material is filled in the notched parts, the cathode parts and the anode parts are connected to a lead frame and the stacked body is molded with an outer jacket resin.

DETAILED DESCRIPTION OF THE INVENTION

The present invention is described in detail below.

Valve-Acting Metal

For the valve-acting metal used as the anode substrate of the solid electrolytic capacitor in the present invention, for example, any of aluminum, tantalum, titanium, niobium, zirconium and alloys using these as a substrate metal can be used. Examples of the shape of the anode substrate include a tabular foil, a plate and a bar. Among these, an electrochemically formed aluminum foil is practically used in many cases because of its excellent profitability. The electrochemically formed aluminum foil used has a thickness of 40 to 200 μm and as a tabular element unit, has a rectangular shape with a length and a width of about 1 to about 30 mm. The electrochemically formed aluminum foil preferably has a width of 2 to 20 mm and a length of 2 to 20 mm, more preferably a width of 2 to 5 mm and a length of 2 to 6 mm.

The dielectric film layer provided on the surface of the anode substrate may be an oxide layer of the valve-acting metal itself, which is produced on the surface portion of the valve-acting metal, or may be another dielectric layer provided on the surface of the valve-acting metal foil. However, the dielectric film layer is preferably a layer composed of an oxide of the valve-acting metal itself.

In the present invention, an anode part is provided in one section at the end part of a tabular anode substrate having formed on the surface thereof a dielectric film layer, a cathode part is provided by forming a solid electrolyte layer and an electrically conducting layer on the remaining portion of the anode substrate, and a notched part is provided at least at one part of the cathode part.

The notched part is preferably provided before forming a dielectric film layer on the anode substrate (valve-acting metal) but insofar as a dielectric film can be formed on the surface of the valve-acting metal in the cut end generated as a result of providing the notched part, the notched part may be provided after forming a dielectric film layer on the anode substrate or before forming a solid electrolyte layer. The timing of providing the notched part is not particularly limited if the surface of the valve-acting metal as the anode substrate is finally covered with a dielectric film layer.

The size of the notched part varies depending on the size of the cathode part and the number of capacitor elements stacked and is determined by a preliminary test. The shape of the notched part may be any known shape such as a circle, elliptical, semicircle, triangle and quadrangle. A plurality of notched parts may also be provided.

The notched part may be provided at any site as long as it is in the cathode part of the capacitor element. For example, in the case of a tabular element, the notched part may be provided at the edge part (peripheral part including corners) or in the center part. However, in view of easy processability, strength of element and the like, the notched part is preferably provided at the edge part.

Figure 2:
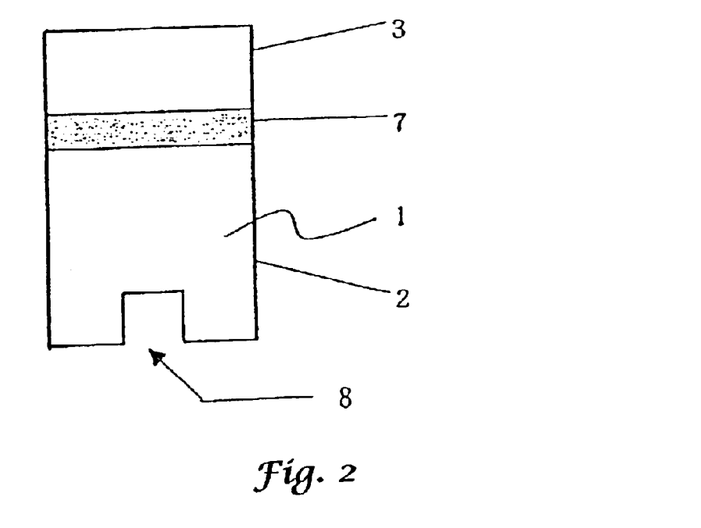
FIG. 2 is a plan view showing an example of a notched part of the capacitor element of the present invention.
Figure 3:
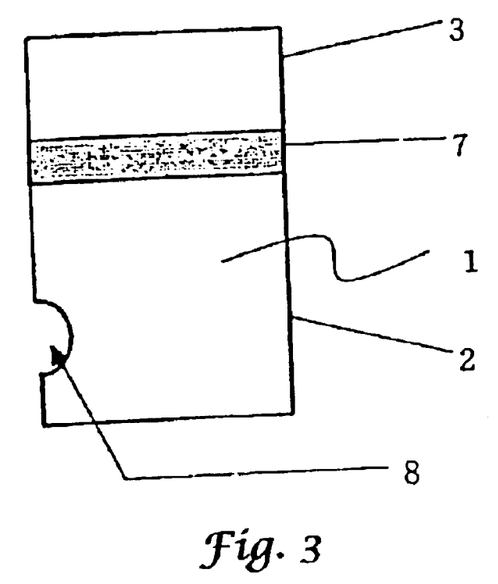
FIG. 3 is a plan view showing another example of the notched part of the capacitor element of the present invention.

At the time of providing a dielectric film on the surface of an electrode material composed of a tabular metal having a valve action, as shown in FIG. 2, a notched part 8 is provided at least at one part in the portion which is to become the cathode part of the capacitor element. In FIG. 2, the notched part has a quadrangular shape but the shape of the notched part is not limited. As shown in FIG. 3, the notched part 8 a may be provided on the side surface.

Solid Electrolyte

On the remaining portion of the dielectric film layer excluding the anode part, a solid electrolyte is formed. The kind of solid electrolyte layer is not particularly limited and a conventionally known solid electrolyte can be used. Particularly, an electrically conducting polymer having a high electrical conductivity is preferred as the solid electrolyte, because the solid electrolyte capacitor manufactured using the polymer has a reduced equivalent series resistance component, has a large capacitance, is small in size and exhibits good high-frequency performance.

The electrically conducting polymer for forming the solid electrolyte of the solid electrolyte capacitor of the present invention is not limited but is preferably an electrically conducting polymer having a π-electron conjugated system structure. Examples thereof include electrically conducting polymers containing as a repeating unit a structure shown by a compound having a thiophene skeleton, a compound having a polycyclic sulfide skeleton, a compound having a pyrrole skeleton, a compound having a furan skeleton, or the like.

Among the monomers used as a raw material of the electrically conducting polymer, examples of the compound having a thiophene skeleton include derivatives such as 3-methylthiophene, 3-ethylthiophene, 3-propylthiophene, 3-butylthiophene, 3-pentylthiophene, 3-hexylthiophene, 3-heptylthiophene, 3-octylthiophene, 3-nonylthiophene, 3-decylthiophene, 3-fluorothiophene, 3-chlorothiophene, 3-bromothiophene, 3-cyanothiophene, 3,4-dimethylthiophene, 3,4-diethylthiophene, 3,4-butylthiophene, 3,4-methylene-dioxythiophene and 3,4-ethylenedioxythiophene. In general, these compounds are commercially available or can be prepared by a known method (described, for example, in *Synthetic Metals*, Vol. 15, page 169 (1986)).

Examples of the compound having a polycyclic sulfide skeleton which can be used include compounds having a 1,3-dihydro-polycyclic sulfide (also called 1,3-dihydrobenzo[c]thiophene) skeleton and compounds having a 1,3-dihydronaphtho[2,3-c]thiophene skeleton. Furthermore, compounds having a 1,3-dihydroanthra[2,3-c] thiophene skeleton and compounds having a 1,3-dihydronaphthaceno[2,3-c]thiophene skeleton may be used. These compounds can be prepared by a known method, for example, the method described in JP-A-8-3156.

In addition, for example, compounds having a 1,3-dihydronaphtho[1,2-c]thiophene skeleton, 1,3-dihydrophenanthra[2,3-c]thiophene derivatives, compounds having a 1,3-dihydrotriphenylo[2,3-c]thiophene skeleton and 1,3-dihydrobenzo[a]anthraceno[7,8-c]thiophene derivatives can be used.

Compounds optionally containing nitrogen or N-oxide in the condensed ring may also be used, and examples thereof include 1,3-dihydrothieno[3,4-b]quinoxaline, 1,3-dihydrothieno[3,4-b]quinoxaline-4-oxide and 1,3-dihydrothieno[3,4-b]quinoxaline-4,9-dioxide, however, the present invention is not limited thereto.

Examples of the compound having a pyrrole skeleton include derivatives such as 3-methylpyrrole, 3-ethylpyrrole, 3-propylpyrrole, 3-butylpyrrole, 3-pentylpyrrole, 3-hexylpyrrole, 3-heptylpyrrole, 3-octylpyrole, 3-nonylpyrrole, 3-decylpyrrole, 3-fluoropyrrole, 3-chloropyrrole, 3-bromopyrrole, 3-cyanopyrrole, 3,4-dimethylpyrrole, 3,4-diethylpyrrole, 3,4-butylenepyrrole, 3,4-methylenedioxypyrrole and 3,4-ethylenedioxypyrrole. These compounds are commercially available or may be prepared by a known method.

Examples of the compound having a furan skeleton include derivatives such as 3-methylfuran, 3-ethylfuran, 3-propylfuran, 3-butylfuran, 3-pentylfuran, 3-hexylfuran, 3-heptylfuran, 3-octylfuran, 3-nonylfuran, 3-decylfuran, 3-fluorofuran, 3-chlorofuran, 3-bromofuran, 3-cyanofuran, 3,4-dimethylfuran, 3,4-diethylfuran, 3,4-butylenefuran, 3,4-methylenedioxyfuran and 3,4-ethylenedioxyfuran, however, the present invention is not limited thereto. These compounds are commercially available or may be prepared by a known method.

The means for polymerization may be electrolytic polymerization, chemical oxidative polymerization or a combination thereof. Also, a method of first forming a solid electrolyte, which is not an electrically conducting polymer, on the dielectric film and then forming an electrically conducting polymer by the above-described polymerization method may also be used.

The electrically conducting polymer may be formed, for example, by a method where a 3,4-ethylenedioxythiophene monomer and an oxidizing agent each preferably in the form of a solution are coated separately one after another or coated simultaneously on an dielectric film and the polymer is formed (see, JP-A-2-15611 and JP-A-10-32145).

In general, a compound (dopant) having a dopant ability is introduced into the electrically conducting polymer. The dopant may be added to either a monomer solution or an oxidizing agent solution. A compound which serves as the dopant and also as the oxidizing agent, such as a metal salt of organic sulfonic acid, may also be used. The dopant is preferably an arylsulfonate-base dopant. For example, salts of benzenesulfonic acid, toluenesulfonic acid, naphthalenesulfonic acid, anthracenesulfonic acid and anthraquinonesulfonic acid can be used.

Solid Electrolytic Capacitor

On the solid electrolyte layer comprising such an electrically conducting polymer, a conventionally known electrically conducting paste such as carbon paste and/or silver paste is stacked to form an electrically conducting layer, thereby constituting the cathode part (electrically conducting layer formed part). At the boundary of the anode part and the cathode part, an insulating resin layer 7 may be circumferentially (like a headband) formed using an insulating resin layer (resist film for masking).

Figure 4:
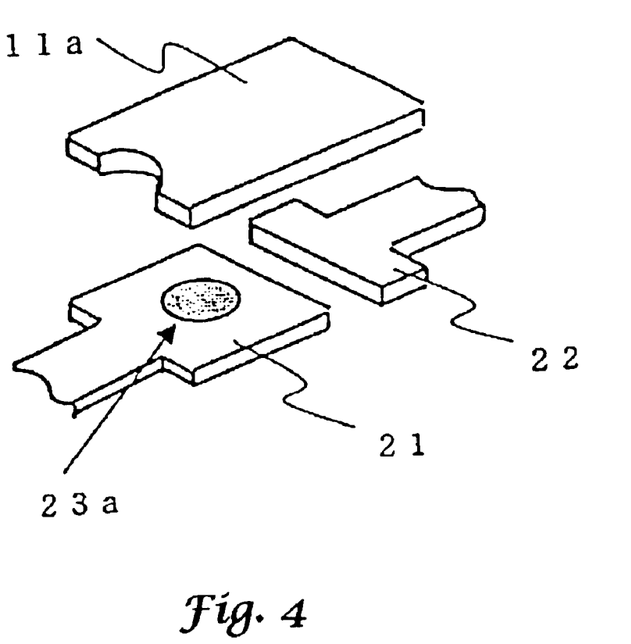
FIG. 4 is a perspective view showing the state of joining a first layer capacitor element of the present invention to the cathode lead part and the anode lead part.
Figure 5:
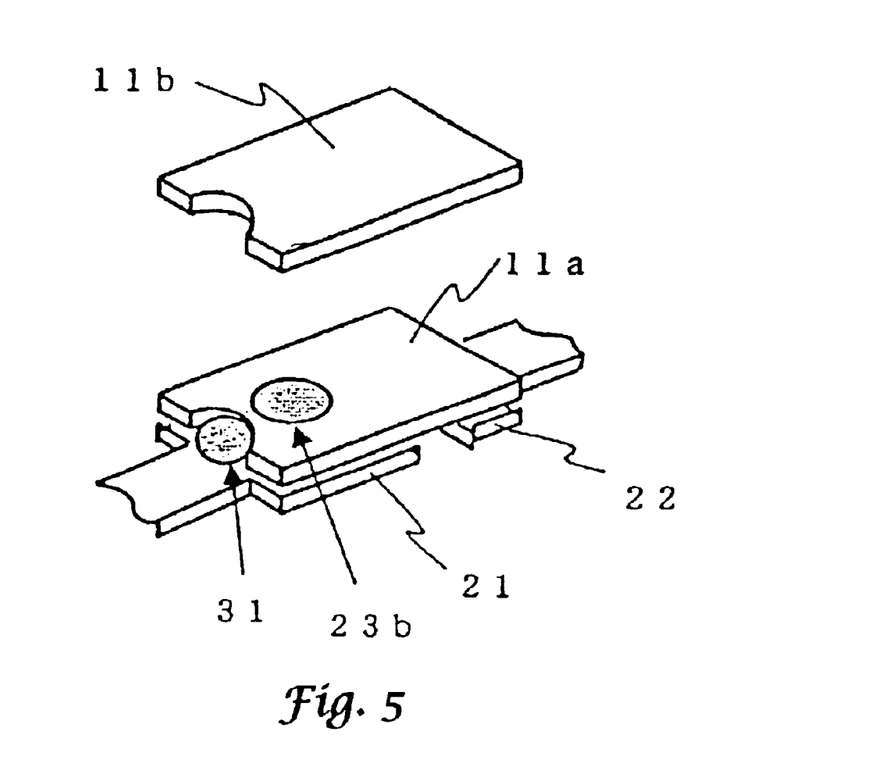
FIG. 5 is a perspective view showing the state of joining a second layer capacitor element of the present invention to the cathode lead part and the anode lead part.
Figure 6:
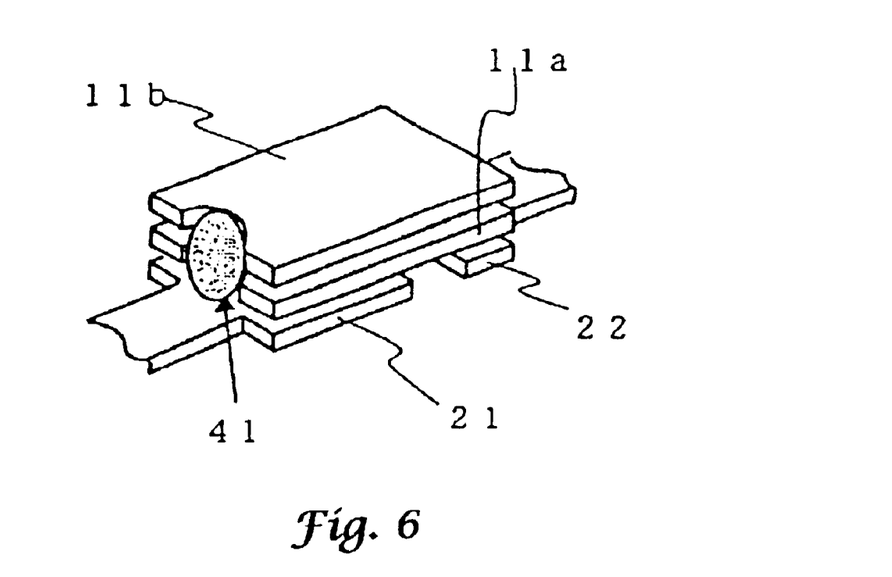
FIG. 6 is a perspective view showing the state where the second layer capacitor element of the present invention is joined to the cathode lead part and the anode lead part.

The method for stacking a plurality of capacitor elements processed until the formation of the electrically conducting layer, while laying the elements in the same direction, is described. As shown in FIG. 4, the capacitor element 11a is joined to a cathode lead part 21 using an electrically conducting adhesive 23a. In FIG. 4, the electrically conducting adhesive is coated on the cathode lead part but the electrically conducting adhesive may be coated in the cathode lead part side, in the capacitor element side or on both sides thereof. When the capacitor element and the cathode led part are joined, as shown in FIG. 5, a part of the electrically conducting adhesive protrudes from the cathode notched part and forms an electrically conducting adhesive part 31 in the periphery of the notched part. Subsequently, the capacitor element 11b is joined on the capacitor element 11a using an electrically conducting adhesive 23b. As a result, as shown in FIG. 6, the excess electrically conducting adhesive protruding from the cathode notched part is brought into contact and integrated with the electrically conducting adhesive part 31 to form an electrically conducting adhesive part 41. Through this electrically conducting adhesive part 41, the first layer capacitor element 11a, the second layer capacitor element 11b and the cathode lead part 21 are electrically and mechanically connected in a direct manner to decrease the electrical resistance between the capacitor element and the cathode lead and between the capacitor elements, whereby a capacitor having reduced equivalent series resistance can be obtained. FIGS. 4, 5 and 6 also show anode lead part 22.

Figure 7:
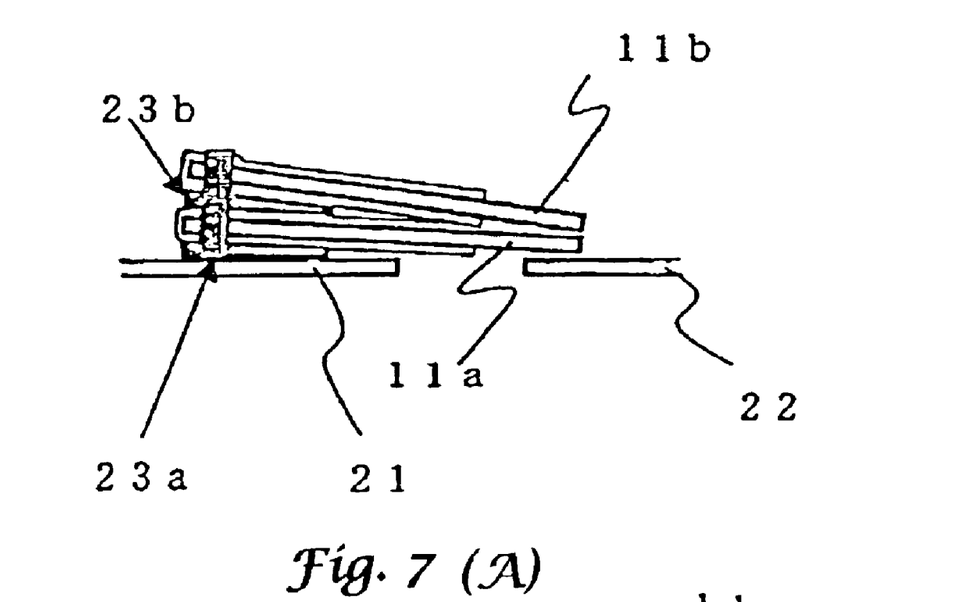
FIG. 7(A) is a cross-sectional view of a solid electrolytic capacitor of the present invention.
FIG. 7(B) is a plan view of a solid electrolytic capacitor of the present invention.

FIG. 7(A) is a cross-sectional view and FIG. 7(B) is a plan view showing the state where stacked capacitor elements are joined by an electrically conducting adhesive. In this Figure, capacitor elements are placed to superpose the notched parts 8 in the cathode parts 2 of the capacitor elements 1 and then the notched parts 8 are integrated by an electrically conducting adhesive to form a stacked capacitor device. As long as the majority of the notched part 8 is filled with the electrically conducting adhesive, a part of the notched part may remain unfilled.

In the stacked capacitor device, the cathode parts of respective capacitor elements alone may be integrated, for example, by dipping these in an electrically conducting material bath such as silver paste and drying and curing the electrically conducting material so as to strengthen the connection of respective capacitor elements with each other. Examples of the electrically conducting material include known electrically conducting pastes such as silver paste, and fusible metals such as cream solder. In the stacked capacitor device, welding which ensures stable strength is sometimes used for connecting the anode parts of a plurality of capacitor elements to the anode lead part. Known examples of the welding include resistance welding, arc welding, laser welding and ultrasonic welding.

The solid electrolytic capacitor device obtained as such is connected to a lead frame and molded with an outer jacket resin such as epoxy resin using a transfer molding machine or the like and then, the projected part of the lead frame is cut in the vicinity of the capacitor device to obtain a chip-form solid electrolytic capacitor.

The material for the lead frame is not particularly limited if it is a commonly employed material, but a copper-base (for example, Cu—Ni, Cu—Ag, Cu—Sn, Cu—Fe, Cu—Ni—Ag, Cu—Ni—Sn, Cu—Co—P, Cu—Zn—Mg or Cu—Sn—Ni—P alloy) material or a material of which surface is plated with a copper-base material is preferably used. When the lead frame is constituted by such a material, effects such as decrease of resistance and enhancement of workability in chamfering the lead frame are obtained.

EXAMPLES

The present invention is described in greater detail below by referring to representative Examples. These are mere examples for describing the present invention, and the present invention is not limited thereto.

Example 1 to 5

A masking in a width of 1 mm was circumferentially formed on both surfaces and both edges of an electrochemically formed aluminum foil (foil species: 110LJB22B, produced by Japan Capacitor Industrial Co., Ltd., rated withstanding voltage: 4 vf) (hereinafter referred to as "electrochemically formed foil") having a notched part and having a shape and a size shown in Table 1 to divide it into two parts, namely, the cathode part (3 mm (width)×4 mm (length)) and the anode part from the distal end. The cathode part of this electrochemically formed foil, which was the divided portion in the distal end side, was electrochemically formed using an aqueous 10 wt % ammonium adipate solution as the electrolytic solution at a temperature of 55° C., a voltage of 4 V, a current density of 5 mA/cm$^2$ and a current passing time was 10 minutes, and then washed with water.

Thereafter, the cathode part was dipped in 1 mol/liter of an isopropyl alcohol solution of 3,4-ethylenedioxythiophene, left standing for 2 minutes, dipped in a mixture aqueous solution of an oxidizing agent (1.5 mol/liter of ammonium persulfate) and a dopant (0.15 mol/liter of sodium naphthalene-2-sulfonate), and then left standing at 45° C. for 5 minutes, thereby allowing the oxidative polymerization to proceed.

This impregnation step and the polymerization step were repeated 12 times in total to form a dopant-containing solid electrolyte layer in micropores of the electrochemically formed foil. The electrochemically formed foil having formed thereon a dopant-containing solid electrolyte layer was washed in warm water at 50° C. to form a solid electrolyte layer.

After the solid electrolyte layer was formed, the foil was again electrochemically formed using an aqueous 10 wt % ammonium adipate solution as the electrolytic solution at a temperature of 55° C., a voltage of 4 V, a current density of 5 mA/cm$^2$ and a current passing time was 10 minutes, then washed with water and dried at 100° C. for 30 minutes. Thereon, a carbon paste and a silver paste were sequentially coated to form an electrically conducting cathode layer.

Three sheets of this capacitor element were superposed and stacked one on another on the cathode lead part and anode lead part of a lead frame using a silver paste as the electrically conducting adhesive while laying the elements in the same direction, and the cathode parts were joined. To the stacked anode parts, the anode lead part was joined by spot welding.

The stacked structure of this capacitor device was molded with a resin and thereto, a voltage of 2.5 V was applied for 45 minutes in an environment of 135° C. In this manner, 50 units of a solid electrolytic capacitor having a structure where three capacitor elements were stacked, and having a rated capacitance of 100 $\mu$F and a rated voltage of 2 V were obtained.

The capacitance and equivalent series resistance of these 50 units of the solid electrolytic capacitor were measured and the results are shown in Table 2.

Example 6

50 Units of a capacitor device were manufactured in the same manner as in Example 1 except for using ferric sulfate in place of ammonium persulfate and using dihydroisothianaphthene in place of 3,4-ethylenedioxythiophene in Example 1. These test samples were evaluated in the same manner as in Example 1. The results are shown in Table 2.

Example 7

50 Units of a capacitor device were manufactured in the same manner as in Example 1 except that pyrrole was used in place of 3,4-ethylenedioxythiophene in Example 1 and the electrochemically formed foil was impregnated with a pyrrole solution, dried at 3° C. for 5 minutes, impregnated with an oxidizing agent solution and then left standing at 5° C. for 10 minutes to allow the polymerization to proceed. These test samples were evaluated in the same manner as in Example 1. The results are shown in Table 2.

Comparative Example 1

50 Units of a solid electrolytic capacitor were manufactured except for using an electrochemically formed foil having no notched part in the cathode part. The performances of the solid electrolytic capacitor are shown in Table 2. In each Example and Comparative Example, all numerical values are an average of 50 units.

TABLE 1

| | Shape of Notched Part | Dimension | Number of Notched Parts | Site |
|---|---|---|---|---|
| Example 1 | semicircle | diameter: 1.0 mm | 1 | short side |
| Example 2 | semicircle | diameter: 0.5 mm | 2 | short side |
| Example 3 | semicircle | diameter: 0.5 mm | 1 | long side |
| Example 4 | equilateral triangle | one side: 0.8 mm | 1 | short side |
| Example 5 | square | one side: 0.8 mm | 1 | short side |

TABLE 2

| | Capacitance ($\mu$F) | ESR (m$\Omega$) |
|---|---|---|
| Example 1 | 97.8 | 6.6 |
| Example 2 | 103.9 | 8.7 |
| Example 3 | 99.1 | 5.8 |
| Example 4 | 98.3 | 7.2 |
| Example 5 | 98.8 | 6.6 |
| Example 6 | 93.3 | 6.9 |
| Example 7 | 100.2 | 7.5 |
| Comparative Example 1 | 98.0 | 18.7 |

Effects of the Invention

When a cathode notched part is provided as such in the cathode part of a capacitor element, the excess electrically conducting adhesive formed in the cathode notched part directly connects the cathode lead part and the sheets of capacitor elements that are stacked, so that the resistance component between the stacked capacitor element and the cathode lead part can be decreased. By virtue of decrease in the resistance component between the capacitor element and the cathode lead part, a solid electrolytic capacitor having a reduced equivalent series resistance component can be produced.

While the invention has been described in detail and with reference to specific embodiments thereof, it will be apparent to one skilled in the art that various changes and modifications can be made therein without departing from the spirit and scope thereof.

What is claimed is:

1. A solid electrolytic capacitor comprising
   a plurality of solid electrolytic capacitor elements each having an anode part assigned to one end of an anode substrate composed of a valve-acting metal having on the surface thereof a dielectric film layer, and a cathode part comprising a solid electrolyte layer formed on the dielectric film layer in a remaining portion of the anode substrate other than the anode part and an electrically conducting layer formed on the solid electrolyte layer,
   wherein the anode parts are stacked on one another and the cathode parts are stacked on one another,
   wherein the stacked anode parts and stacked cathode parts are connected to a lead frame and are molded with an outer jacket resin, and
   wherein each solid electrolytic capacitor element has a notched part at least at one portion of the cathode part and an electrically conductive material at least partially fills the notched part.

2. The solid electrolytic capacitor as claimed in claim 1, wherein the notched part in the cathode part of the solid electrolytic capacitor element is present at an edge of the cathode part.

3. The solid electrolytic capacitor as claimed in claim 1, wherein the solid electrolytic capacitor element has an insulating resin band circumferentially formed at a boundary of the anode part and the cathode part.

4. The solid electrolytic capacitor as claimed in claim 1, wherein the notched parts in the stacked cathode parts are covered with an electrically conducting material.

5. The solid electrolytic capacitor as claimed in claim 1, wherein the valve-acting metal is selected from the group consisting of aluminum, tantalum, titanium, niobium and an alloy thereof.

6. The solid electrolytic capacitor as claimed in claim 1, wherein the valve-acting metal comprises an electrochemically formed aluminum foil or an electrically formed niobium foil.

7. The solid electrolytic capacitor as claimed in claim 1, wherein the valve-acting metal comprises an electrochemically formed foil obtained by electrochemical forming at a voltage of less than 30 V.

8. The solid electrolytic capacitor as claimed in claim 1, wherein the lead frame comprises a copper or copper alloy-based material.

9. The solid electrolytic capacitor as claimed in claim 1, wherein the solid electrolyte contains a $\pi$-electron conjugated system polymer.

10. The solid electrolytic capacitor as claimed in claim 9, wherein the $\pi$-electron conjugated system polymer is a polymer obtained from a 5-membered heterocyclic compound.

11. The solid electrolytic capacitor as claimed in claim 10, wherein the 5-membered heterocyclic compound is selected from the group consisting of pyrrole, thiophene, furan, isothianaphthene, 1,3-dihydroisothianaphthene and substitution derivatives thereof.

12. The solid electrolytic capacitor as claimed in claim 10, wherein the 5-membered heterocyclic compound is selected from the group consisting of 3,4-ethylenedioxythiophene and 1,3-dihydroiso-thianaphthene.

13. A method for producing a solid electrolytic capacitor, comprising the steps of:

provisioning an anode part at one end of an anode substrate composed of a valve-acting metal having on the surface thereof a dielectric film layer, forming a notched part in the valve-acting metal in a remaining portion of the anode substrate other than the anode part;

forming a solid electrolyte layer on the dielectric film layer of the valve-acting metal in the remaining portion of the anode substrate, forming an electrically conducting layer on the solid electrolyte layer to prepare a solid electrolytic capacitor element having a cathode part, stacking a plurality of the solid electrolytic capacitor elements wherein the notched parts are superposed one on another, at least partially filling an electrically conducting material in the notched parts, connecting the cathode parts and the anode parts to a lead frame, and molding the stacked body with an outer jacket resin.

14. The method for producing a solid electrolytic capacitor as claimed in claim 13, wherein the plurality of the solid electrolytic capacitor elements each has an insulating resin band circumferentially provided at a boundary of the anode part and the cathode part.

* * * * *